(12) United States Patent
Girardi et al.

(10) Patent No.: US 8,000,600 B2
(45) Date of Patent: Aug. 16, 2011

(54) METHOD AND AN APPARATUS FOR PREVENTING TRAFFIC INTERRUPTIONS BETWEEN CLIENT PORTS EXCHANGING INFORMATION THROUGH A COMMUNICATION NETWORK

(75) Inventors: Raffaele Girardi, Turin (IT); Benedetto Riposati, Turin (IT); Gianluca Rizzo, Cavallino (IT)

(73) Assignee: Telecom Italia S.p.A., Milan (IT)

( * ) Notice: Subject to any disclaimer, the term of this patent is extended or adjusted under 35 U.S.C. 154(b) by 1235 days.

(21) Appl. No.: 11/630,665

(22) PCT Filed: Jun. 28, 2004

(86) PCT No.: PCT/EP2004/006984
§ 371 (c)(1),
(2), (4) Date: Dec. 26, 2006

(87) PCT Pub. No.: WO2006/000243
PCT Pub. Date: Jan. 5, 2006

(65) Prior Publication Data
US 2009/0190466 A1    Jul. 30, 2009

(51) Int. Cl.
*H04B 10/08* (2006.01)
(52) U.S. Cl. ............... 398/33; 398/14; 398/19; 398/34; 370/228; 370/229
(58) Field of Classification Search ............ 398/3, 4, 398/5, 2, 1, 33, 58, 59, 66, 7, 14, 25, 34, 398/12, 19; 370/229, 230.1, 231, 235, 237, 370/254, 217, 225, 228
See application file for complete search history.

(56) References Cited

U.S. PATENT DOCUMENTS

| | | | |
|---|---|---|---|
| 5,784,387 A | 7/1998 | Widmer | |
| 6,233,073 B1 * | 5/2001 | Bowers et al. | 398/16 |
| 6,594,249 B1 | 7/2003 | Goldberg | |
| 6,600,753 B2 * | 7/2003 | Henson | 370/420 |
| 6,996,097 B1 * | 2/2006 | Chou et al. | 370/389 |
| 7,113,699 B1 * | 9/2006 | Bhate et al. | 398/15 |
| 2001/0040870 A1 | 11/2001 | Ohmori et al. | |
| 2002/0194524 A1 | 12/2002 | Wiley et al. | |
| 2003/0076779 A1 | 4/2003 | Frank et al. | |

OTHER PUBLICATIONS

ANSI, "Fibre Channel—Physical and Signalling Interface—3 (FC-PH-3)", ANSI X3.303-199x, pp. i-xxi, 1-113, (Nov. 1997).

* cited by examiner

*Primary Examiner* — M. R. Sedighian
(74) *Attorney, Agent, or Firm* — Finnegan, Henderson, Farabow, Garrett & Dunner, L.L.P.

(57) ABSTRACT

A method for preventing a temporary traffic interruption between two client ports and the consequent state transition of the receiving port in a communication network providing for the transmission of a data stream between two clients along at least one path when a fault condition is detected in the path. The method includes the steps of monitoring the data stream directed to the receiver and, upon detecting in the data stream an error sequence capable of starting the state transition, replacing the data stream with a filling data stream to prevent the receiver from detecting an error condition, and resuming the forwarding of the received data stream after a predetermined time interval. An apparatus able to mask to the receiver for the predetermined time interval, a storage area network and a computer program product are also disclosed.

36 Claims, 7 Drawing Sheets

METHOD AND AN APPARATUS FOR PREVENTING TRAFFIC INTERRUPTIONS BETWEEN CLIENT PORTS EXCHANGING INFORMATION THROUGH A COMMUNICATION NETWORK

CROSS REFERENCE TO RELATED APPLICATION

This application is a national phase application based on PCT/EP2004/006984, filed Jun. 28, 2004, the content of which is incorporated herein by reference.

FIELD OF INVENTION

The present invention relates in general to communication networks connecting two or more users for exchanging data streams, wherein the network can experience micro interruption due to technical problems and/or to reconfiguration of the network, for example when there is a protection switching between two separate paths switchable to one another, said switching being provided by said network for redundancy purposes.

More particularly, the invention relates to a method and an apparatus for preventing traffic interruptions in Storage Area Networks (SAN) connecting two or more users for exchanging information data and geographically extended using a Wide Area Network, such as WDM (Wavelength Division Multiplexing) or SDH/SONET (Synchronous Digital Hierarchy/Synchronous Optical NETwork) networks, transporting the Fibre Channel (FC) protocol.

BACKGROUND OF INVENTION

Present invention is disclosed by using implementation examples for Storage Area networks using Fibre Channel protocol.

Nevertheless, the invention can be applied in general to similar networking contexts.

A SAN or Storage Area Network is a network whose primary purpose is to transfer data between computer systems and storage elements and among storage elements.

A largely used protocol in the SANs is the FC (Fibre Channel) protocol as standardises by ANSI (American National Standard Institute): ANSI X3.303-1998, *Fibre Channel Physical and Signalling Interface*-3 (FC-PH-3).

Such a protocol allows for an optimised transfer of large data blocks with high performance.

In the following, basic information on the FC protocol is described in order to better clarify the implementation examples.

The FC protocol provides for both the feature of an I/O bus and the flexibility of a network protocol and is adapted both for short distance networks (copper line) and long distance networks (optical fiber) up to a few hundreds of km. FC Network topologies comprise point-to-point topology, a ring type topology named Arbitrated Loop and arbitrary meshed topologies named switched fabrics.

The FC protocol is organised, according to the standard, on 5 layers, approximately corresponding to the first 4 layers of the OSI stack.

The FC-0 layer defines the physical layer of the transmission and describes the electric and optical parameters of the transmitters and receivers of an FC port. Therefore the FC-0 layer defines an analogical interface (generally an optical interface) towards the physical connection, and a digital interface towards the FC-1 layer, with the information being exchanged in form of bit streams with the FC-1 layer.

The layer FC-1 defines the transmission protocol, and deals with the line coding, the generation and termination of the control frames, the delimitation of the data frames, the management of the flow control on the link. Moreover, layer FC-1 defines the operational states of a transmitter and a receiver, and in general of an FC port which, according to the FC standard, comprises a receiver and a transmitter. In the FC protocol, and more precisely at layer FC-1, a channel encoding of 8B/10B type is used to improve the error detection mechanisms and to help bit, byte and word (made up by 4 byte) synchronisation recovery.

The basic information unit transmitted on the link is a sequence of 10 bits, defined as a "transmission character" (TC), belonging to an alphabet of 1024 ($2^{10}$) elements. 512 of these elements are used to code data bytes (8 bits); for each of the 256 ($2^8$) possible bytes of data there exist two coding transmission characters. Moreover, according to the 8B/10B coding, further twelve characters of the alphabet are reserved for the transmission of service information.

According to the FC protocol, only one of the twelve characters is used: this character is named "comma", and it is used at the receiving side for identifying the beginning of an "Ordered Set".

In a system using FC protocol the stream of exchanged information comprises a sequence of Transmission Words (TWs), that are a sequence of 4 TCs.

TWs are divided into data words and control words. The control TWs are called "Ordered Set" and are distinguished from the data TWs by the first of the four 10B TCs which, in control TWs, is a "comma".

Such "Ordered Sets" (ordered sets) are used to delimit a data frame or a control end-to-end frame (SOF, Start of Frame and EOF, End Of Frame), to exchange information concerning the control of buffer-to-buffer stream at link layer (R_RDY), to implement a number of procedures related to the management of a link or port state ("primitive signals"). In particular, the ordered sets of the IDLE type are used for maintaining the link active and initialised during the transmission when there are no frames to be transmitted, thus allowing the receiver to keep the synchronisation at bit, character and word levels.

These ordered sets are distinguished one from another by the informative content of the 10B characters in the second, third and fourth positions of the transmission word TW.

A transmitting FC port has to interpose a minimum of 6 ordered set of the IDLE or R_RDY types between two subsequent frames, while in a received signal there must be at least two ordered sets belonging to such categories (IDLE or R_RDY types) between two frames.

Namely, along the FC link between the two client devices IDLE frames can be either extracted or inserted to compensate for possible differences between the synchronism frequencies of the receiver and the transmitter. The lower limit of 2 ordered sets is used for allowing the receiver a time enough for processing a received data frame before the arrival of the next one.

When preparing the data to be transmitted according to the 8B/10B coding, the choice on which (of the two) characters to use for coding a data byte is accomplished by trying to balance the average number of bits 1 and bits 0 in the stream of the transmitted data to reduce as much as possible the low frequency component of the signal, as known to a skilled in the field.

The difference between the number of transmitted 0s and 1s is defined as "running disparity" (RD). At the transmission side such difference is used for choosing the characters through which the data bytes are coded. At the receiving side it is recalculated and used as a further tool for checking the presence of errors in the received data stream.

A transmission character with a number of bits 1 larger than that of bits 0 is defined as having a positive RD, whereas RD is defined negative when the number of bits 0 is larger than the number of bits 1. If the numbers of bits 0 and of bits 1 are equal, then the RD of the character is defined "neutral". At the receiving side, the RD of a receiver is defined as the RD value expected for the next character.

Likewise to the transmissions character, each transmission word has an RD of its own, that can be positive, negative or neutral.

After receiving an ordered set of the EOF, IDLE, or R_RDY type (and generally for all the ordered sets but for SOF), the expected RD for the next character to be received is always negative. This way such ordered sets can be extracted from or inserted into the data stream at the intermediate nodes of an FC connection without altering (and requiring a recalculation on the RD of the stream.

When a received character does not match the expected RD value, or the received character is merely invalid (i.e. not used for exchanging meaningful information and therefore not belonging to the set of control characters or to the set of characters for coding data bytes), such character generates a "code violation error". Namely, at the receiver each character is decoded by looking for the corresponding 8B byte in the set of the 10B TC having the expected RD value. When the RD of the received word is different from the expected one, it cannot be successfully decoded thus causing a code violation error.

Also in case of error, the RD of the 10B received word is anyhow used for updating the actual count of RD and therefore the expected RD for the next 10B word.

In recent years there has been an increasing interest towards the extension of the SAN to metropolitan and geographical areas, although this type of network was originally devised for limited areas such as the intra-building networks. The main reason of such interest comes from the possibility of realising backup copies of strategic information at different locations and safeguarding data integrity in case of catastrophic events (fires, earthquakes, floods, etc.) that are likely to strike only one of such locations.

The above extension of the SAN implies the transport of FC signals through the networks used in geographical-metropolitan connections, such as SDH (Synchronous Digital Hierarchy) also known as SONET (Synchronous Optical NETwork) transmission system, and WDM (Wavelength Division Multiplex) in order to use transport means already developed for other types of services. From an architectural point of view the interconnection between two FC devices is illustrated in the general scheme of FIG. 1 where two devices labelled FC Client are connected to each other through terminal apparatuses of a WAN/MAN (Wide Area Network/Metropolitan Area Network) network and the FC streams is properly adapted to the transmission along the network. In this scheme, the FC clients represent any devices equipped with FC ports, such as switches of a FC SAN, computer systems with FC HBA (Host Bus Adapter) or storage systems with FC controllers.

In case an SDH network is used, the FC signal is inserted into the SDH frame at the transmission side and extracted at the receiving side in accordance with both standardised and proprietary mapping procedures.

In case a WDM network is used, the FC signal is typically transmitted without any mapping (transparent transport), that is the adaptation operation simply consists of a regeneration of the signal coming from (or going to) the switch.

In order to increase the connection reliability of the network, particularly against failure and malfunctions, both SDH and WDM networks use protection techniques in which the signal is simultaneously transmitted along two separate paths between source and destination, i.e. an active ("working") path and a backup ("protection") path, respectively.

With reference again to FIG. 1, a WDM or a SDH/SONET network is shown connecting FC client apparatuses for exchanging information among them. Each client is connected to the network via a terminal device, such as an OADM (Optical Add and Drop Multiplexer) or a SDH/SONET ADM (Add and Drop Multiplexer) through which it is connected to the network. The network provides for two links or paths connecting the terminal devices, that are capable of switching from one path to the other, i.e. of selecting anyone of the two signals. For simplicity's sake, the information flows have been indicated in one direction only, although the connections (links) are bi-directional.

Under normal operating conditions, the terminal device switch selects the signal coming from the working path whereas in case of a failure in the working path, the signal from the "protection" path is selected.

The time required to detect the failure and to switch the path is typically of the order of a few tens of milliseconds and for such time interval the connection between the two client apparatuses (e.g. FC clients) is to all practical purposes unavailable. Moreover, because of such interruption and since the lengths of the two paths are always different, after a protection switching the client apparatus receives a signal that is not properly timed in respect to the one received just before the failure.

The above drawback afflicts both an FC link transported on a WDM link that is protected at optical level, and an FC link transported on a SONET/SDH connection and protected according to known schemes.

Therefore both in optical WDM networks and in SDH/SONET networks a path switching event causes a time interval in which the signal reaching the receiver of an FC port is absent or does not carry meaningful information.

The intervention of a protection scheme along the optical path of a FC link can cause a number of problems to the FC receiver, relating, in particular, to the FC-0 and FC-1 layers.

Two of such problems are considered with more details in the following.

The optical signal received by the FC port undergoes a continuity interruption. As a consequence the receiver detects a LOS (Loss Of Signal) that drives it, according to the FC standard, from a "Synchronisation Acquired" state into a "Loss Of Synchronisation" state.

The same state transition may occur when receiving a sequence of error-containing transmission words In particular such a situation occurs when the FC receiver receives an optical signal that does not carry meaningful information.

More particularly, a receiver reaches a Loss Of Synchronisation state after either receiving a LOS (Loss Of Signal) detection, or after receiving four consecutive wrong transmissions words, i.e. containing:

a transmission character (10B characters) with code violations (i.e. 10B characters that are neither included in the characters codifying data bytes nor among the 12 reserved characters for transmitting control information) in at least one of the 4 TCs forming a TW, or a 10B character comprised in the 12 control character in the second, third or fourth position, or a running disparity error.

The FC port transition to a Loss of Sync state has two negative consequences:

when the link is available again, a delay occurs before the data stream can restart, as the FC port must regain the Synchronization acquired state;

when the FC link is not a point-to-point connection but rather belongs to a FC "fabric", the temporary inactivity of the FC port due to the state modification is perceived by the FSPF (Fabric Shortest Path First) routing protocol (which is part of FC protocol) like a topological modification of the fabric requiring a reconfiguration procedure of the same and a search for a new path in the fabric in order to connect again the FC concerned ports.

Experimental tests carried out by the Applicant have shown that in a WDM optical connection, a protection intervention with a switching time of less than 50 ms could cause a traffic interruption up to 20 seconds and longer due to that the FC ports are driven into a Loss of Synchronisation state.

Such a unnecessary traffic interruption is considered by the Applicant a very significant problem in particular for applications requiring real time consistency of data in a plurality of locations.

The same problem, verified for FC protocol, may occur for other protocols, wherein a short link interruption may cause a long traffic interruption due to network reconfiguration procedures.

The same problem, described with reference to interruptions of the signal due to a path switching event, can occur in the same way in every situation in which there is a brief and temporary interruption of the meaningfulness of the signal reaching the receiver.

FIG. 2 shows a block diagram of a generic receiver of an FC port, according to Prior Art. Such scheme illustrates the processing of the received information at layer FC-0 and at part of layer FC-1 and will be used as a reference for describing the invention.

A photodiode 12 usually implements the conversion from the optical signal S1 coming from the fibre to an electric signal. The serial bit stream at the output of the photodiode 12 is led as an input to a PLL device 13 to recover the bit synchronism signal from the received signal by frequency and phase locking with a local oscillator.

Both the received data stream and the bit synchronism are input to a serial-parallel converter 14 that converts the serial data stream into a 10 bit parallel stream by using the bit synchronism signal. The output of converter 14 comprises a 10-bit transmission character and a synchronism character signal having a frequency (rate) equal to $1/10$ of the bit synchronism signal frequency. The 10-bit parallel signal at the output of the converter is sent to a 10B/8B decoder 15 which converts the data characters into the corresponding byte, and is detects the "comma" characters and the code violation events.

The 8-bit parallel stream at the output of the decoder 15, together with the byte synchronism signal and signal acknowledging the receipt of the comma character, are sent to a byte-word demultiplexer 16 which provides a 32-bit parallel signal and a word synchronism signal at its outputs.

An FC transmitter, not shown in the drawings, provides for components performing the reverse functions, namely a multiplexer, a coder, a serial-parallel converter and a converter.

Such a receiver, according to the known network architectures, undergoes all previously described problems.

US 2003/0076779 A1 discloses an apparatus for detecting and suppressing corrupted data frames transported from a protected SONET network using an encapsulation/de-encapsulation technique allowing the passage through the SONET link of FC data frames only and blocking those carrying control information.

Applicants remark that the solution according to US 2003/0076779 A1 is only able to remove some type of corrupted data frames in order to maintain the integrity of the flow control mechanism based on the buffer-to-buffer credit count as in the FC standard and is not directed to solve the above mentioned problem.

U.S. Pat. No. 6,600,753 discloses a method for sanitizing a data frame in a Fibre Channel Arbitrated Loop by replacing the first transmission word found to be erroneous in a data stream with an ordered set of the EOF type and replacing the remaining of the frame with fill (buffering) frames. The remaining FC traffic (control and IDLE frames) is left unchanged even if it contains errors.

Applicants remark that said document does not teach how to prevent the interpretation of a short link interruption, e.g. an interruption that can be generated by a protection intervention in the transport network, as an error conditions at layers FC-1 and FC-2.

SUMMARY OF INVENTION

It is therefore an object of the present invention to overcome the drawbacks and limitations of the prior art, and particularly to prevent traffic interruptions due to unnecessary network reconfiguration procedures.

It is a further object of the invention to provide for an improved optical protection in FC links.

The above objects of the present invention are achieved through a method for preventing a temporary traffic interruption between transmitting and receiving client ports in a communication network providing for the transmission of a data stream along at least one path and wherein a link interruption is able to cause a reconfiguration procedure at the receiving client port, said method comprising the steps of:

monitoring the data stream as received by the receiving client port and upon detecting in said data stream at least one predetermined error sequence;

replacing said data stream as received with a filling data stream to prevent the receiving client port from detecting an error condition and from causing the reconfiguration procedure; and resuming the forwarding of the data stream as received after a predetermined time interval.

The objects of the present invention are also achieved through an apparatus for use in a communication network wherein at least one path is provided between transmitting and receiving client ports for exchanging a data stream through the network and wherein a link interruption is able to cause a reconfiguration procedure at the receiving client port, the apparatus being capable of masking to the receiving client ports the link interruption for a predetermined time interval, said apparatus comprising:

a monitoring and detecting unit for receiving the data stream directed to said receiving client port and for detecting in said data stream at least one predetermined error sequence; and a generator of filling data streams controlled by said monitoring and detecting unit for selectively sending, to said receiving client port and for a predetermined time interval, said filling data streams adapted to prevent the receiving client port from detecting an error condition and from causing the reconfiguration procedure.

The objects of the present invention are further achieved by a storage area network (SAN) comprising transmitting and receiving client ports connected through a transport network providing for the transmission of a data stream along at least one path and wherein a link interruption is able to cause a reconfiguration procedure at the receiving client port, said network comprising a monitoring apparatus for monitoring the data stream as received by said receiving client port and for replacing said data stream with a filling data stream for a predetermined time interval to prevent the receiving client port from detecting an error condition and from causing the reconfiguration procedure.

Moreover, object of the invention is a computer program product, loadable in the memory of at least one computer (e.g. a processor such as a microprocessor) and including software code portions for performing the steps of the invention when the product is run on a computer. As used herein, reference to such a computer program product is intended to be equivalent to reference to a computer-readable medium containing instructions for controlling a computer system to coordinate the performance of the invention. Reference to "at least one computer" is evidently intended to highlight the possibility for the present invention to be implemented in a distributed modular fashion.

In particular, according to the invention there are provided an apparatus and a method for temporarily masking to the receiver, for example of an FC port, a condition that could be considered as an interruption of the received optical signal and as a trigger of the topology reconfiguration mechanism provided, e.g. by the upper FC protocol layers, and for applying to the receiver, e.g. an FC receiver, a signal adapted to keep the link active.

The interruption condition is either the absence of a signal at the output of the terminal apparatus of a transport network (such as for example a WDM or SDH/SONET network) or the presence of a signal that does not carry meaningful information.

The purpose of such masking which is carried out for a defined time interval, is for example to prevent the FC receiver from entering into a Loss Of Synchronisation state.

Particularly, in apparatuses of a transport network that implement a protection of the 1+1 type, the invention allows to hide to the FC receiver the time interval is from a link failure and the switching to the protection path.

Upon the restoration of the connection that has been interrupted because of the protection switching, the masking provided by the invention allows for an immediate recovery of the operation, i.e. in few milliseconds.

According to the invention the data stream directed to the FC receiver is monitored and upon detecting a sequence of erroneous events, non-sporadic and anyhow susceptible of causing an unavailability of the FC link, the erroneous traffic is temporarily replaced by a locally generated filling traffic adapted to keep the FC receiver active.

After a predetermined time interval (depending on the time required for switching to the protection path), the traffic received from the transport network is transmitted to the FC receiver and the filling traffic is stopped.

Therefore, in case the signal received from the transport network after a predetermined time interval is a valid FC data stream, an unnecessary fabric reconfiguration has been avoided. In case that, after the above predetermined time interval the received traffic is still invalid, the FC fabric will detect the error condition and take care of starting a recovery procedure such as a search for an alternative routing in the fabric.

The method is completely transparent to all the non-persistent errors and generally to those errors that do not affect the availability of the FC connection to the receiver.

Since the Fibre Channel standard FC is supposed to operate on optical connections ensuring a very low error probability ($10^{-12}$), it is quite unlikely that an error sequence different from the one discussed above (the intervention of a protection mechanism) accidentally. triggers the apparatus of the invention, and anyhow a transparent transmission towards the FC receiver FC is resumed as soon as the presence of valid frames is detected.

In accordance with the most preferred embodiment of the invention, the following events are not detected and are therefore transparently transmitted to the FC receiver:
  loss of frame;
  loss of ordered data frames;
  CRC errors (on payload and header of the data frames);
  Erroneous Transmission Words (when they do not lead the Fibre Channel receiver FC into a Loss Of Synchronisation state);
  running disparity errors (being detected by an FC receiver as non valid TW errors, the above considerations apply).

According to the most preferred embodiment of the invention, the following events are detected and masked for a given time interval to the FC receiver:
  receipt of a sequence of erroneous transmission words such as to drive the FC receiver into a Loss Of Synchronisation state;
  no receipt of the optical signal.

The apparatus of the invention can be implemented as an apparatus inserted in the signal path between a device of the transport network (providing an optical protection function) and a client device of the FC type. There are possible several embodiments thereof, such as:
a) a stand-alone apparatus;
b) integrating the functions of the invention in the apparatus of the transport network with several possible solutions of the terminal WDM/SDH apparatuses;
c) integrating the functions of the invention in the client apparatus.

In accordance with embodiment a) the stand-alone apparatus is disposed as a Decoupling Device in the signal path between the client apparatus or device (such as a switch, an HBA) and the apparatus of the transport network implementing the optical protection function (such as an ADM, OADM). The input signal comes from the network apparatus and the output signal is directed to the FC apparatus, while in the opposite direction the Decoupling Device does not operate.

The embodiments b) and c) will be discussed later on.

BRIEF DESCRIPTION OF THE DRAWINGS

The invention will be now disclosed hereinbelow with reference to the attached drawings of preferred but non limiting embodiments thereof, in which.

Throughout all the Figures the same references have been used to indicate components that are equal or implement substantially equivalent functions.

DETAILED DESCRIPTION OF THE INVENTION

The process presented herein is not inherently related to any particular apparatus or computer. In particular, various general purpose machines may be used with programs having corresponding code segments written in accordance with the teachings herein, or it may be more convenient to construct a more specialised apparatus to perform the required method steps. The required structure for a variety of these machines will appear from the description given below.

Figure 3:
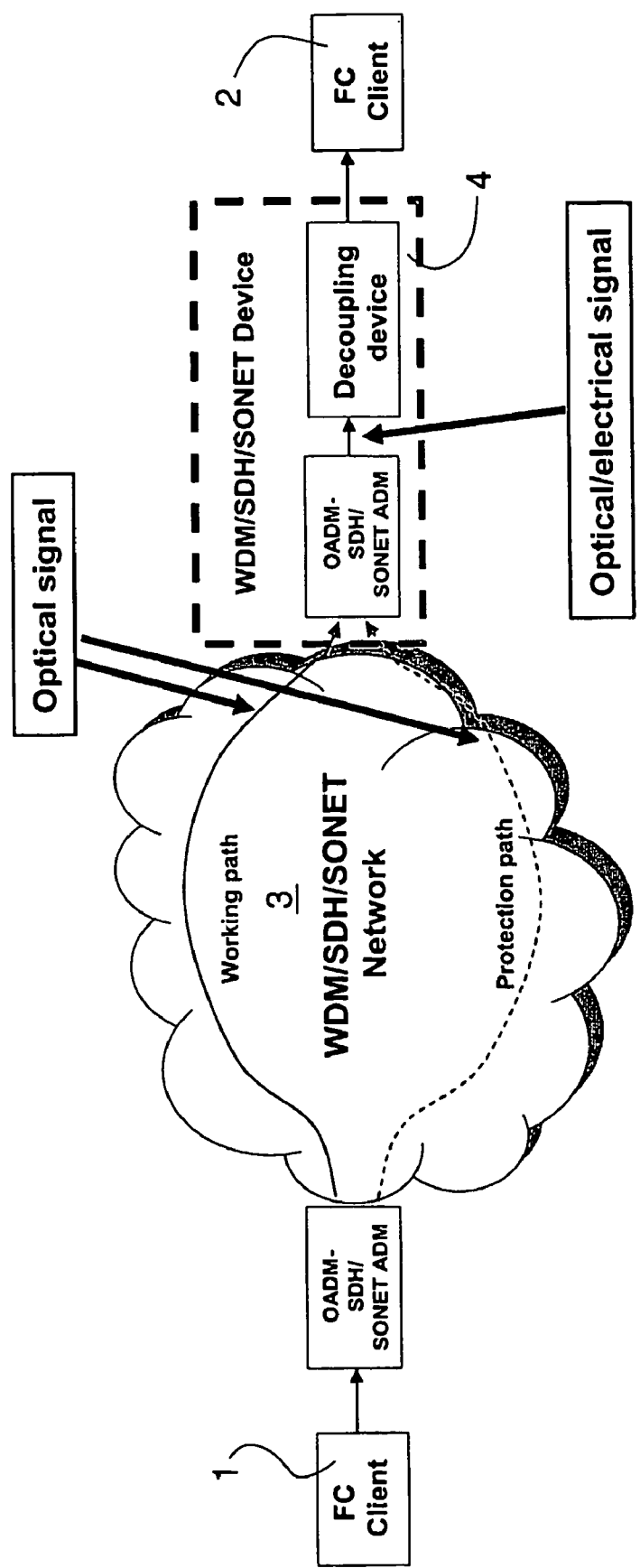
FIG. 3 schematically illustrates the information stream between two FC clients is through a WDM or a SDH/SONET network.

FIG. 3 schematically shows the path of an FC information stream from the FC port of a client transmitter 1 to the FC port of a client receiver 2 through a WDM or a SDH/SONET network 3. For simplicity's sake, in the Figure the FC connection is shown in one direction only whereas the connection is two-ways. In the Figure, an apparatus 4 according to the invention is shown in a dashed box, located between the receiving WDM (or SDH/SONET) apparatus and the FC port of the client receiver 2. The apparatus intervenes only on the information traffic from the WDM/SONET/SDH apparatus to the FC port but is inactive in respect of the information stream in the opposite direction.

Figure 4:
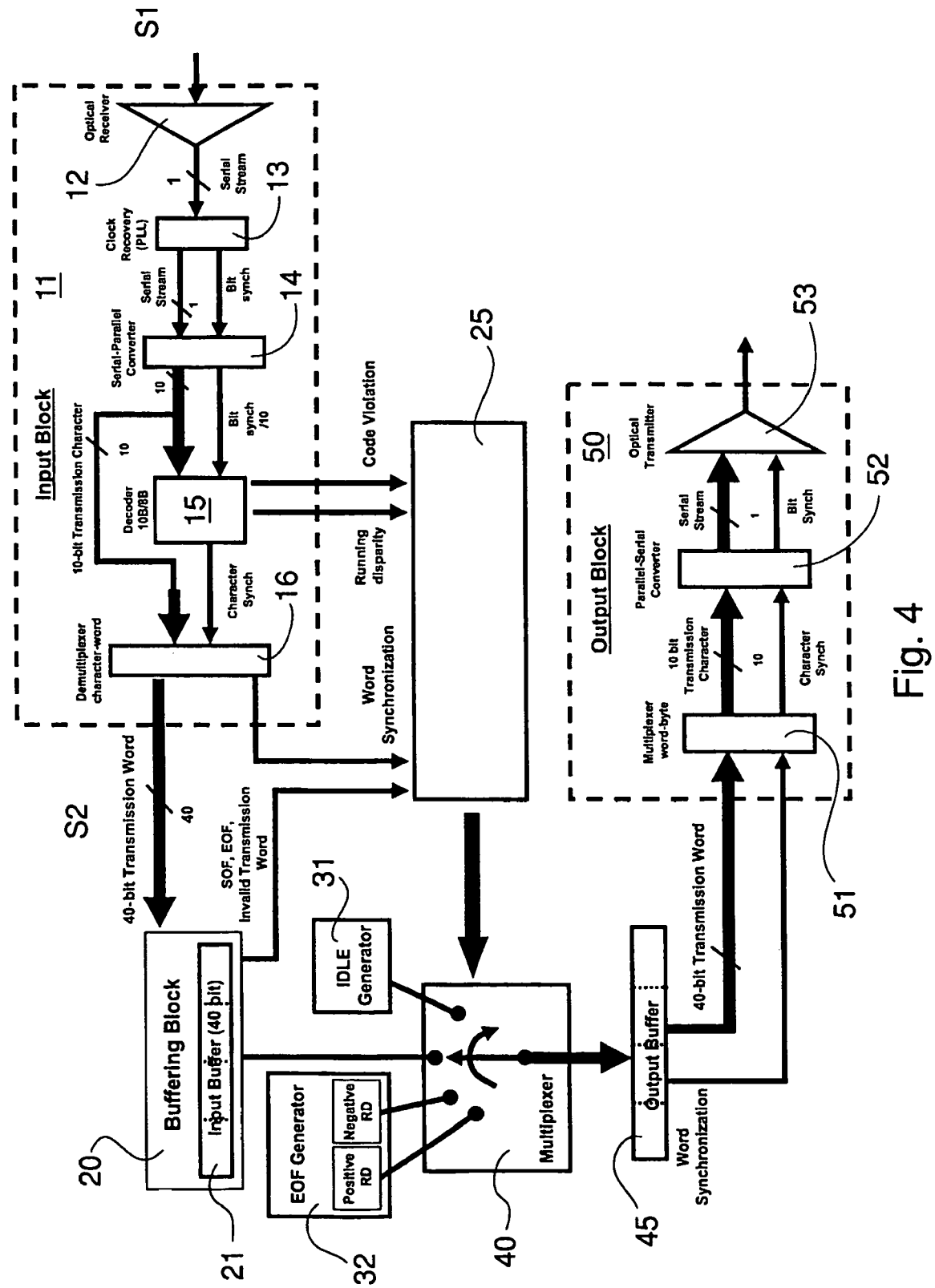
FIG. 4 is a block diagram of an embodiment of the invention.

The apparatus 4 can be integrated with the WDM or SONET/SDH apparatus (as shown in FIG. 3) or can be a separate device connected in the optical path between the network receiving apparatus and the FC port of the client receiver. With reference now to the block diagram of FIG. 4, an embodiment of the invention will now be disclosed, with further reference to the flow chart of FIG. 5. The apparatus according to the invention shown in FIG. 4 comprises: an input block 11 (incorporating a receiver), a buffer 20, a generator 31 of ordered set of the IDLE type, a generator 32 of ordered set of the EOF type, a multiplexer 40, an output buffer 45, an output block 50 (incorporating a transmitter), and a control unit 25.

Figure 1:
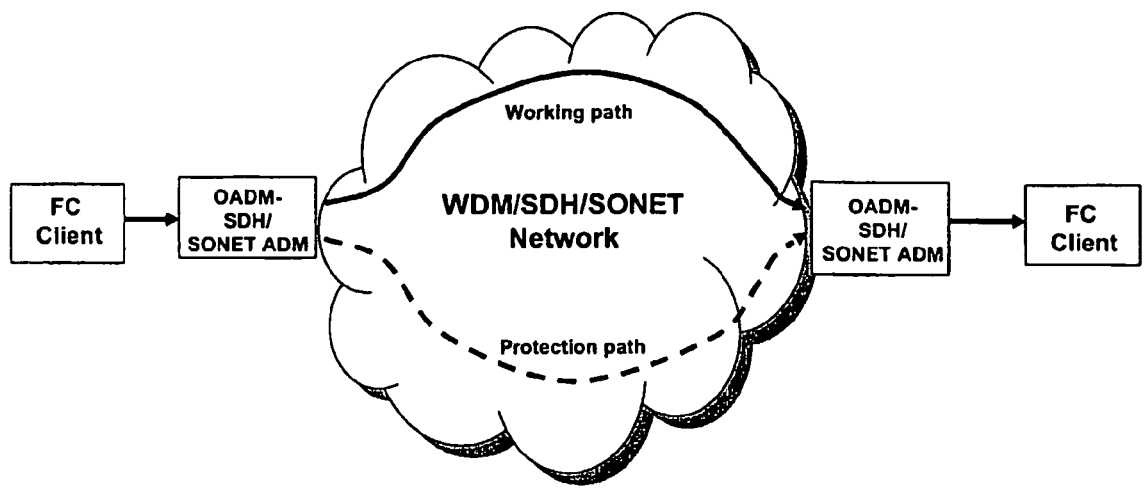
FIG. 1, schematically illustrates the information stream in an FC system that exploits a WAN data transport.
Figure 2:
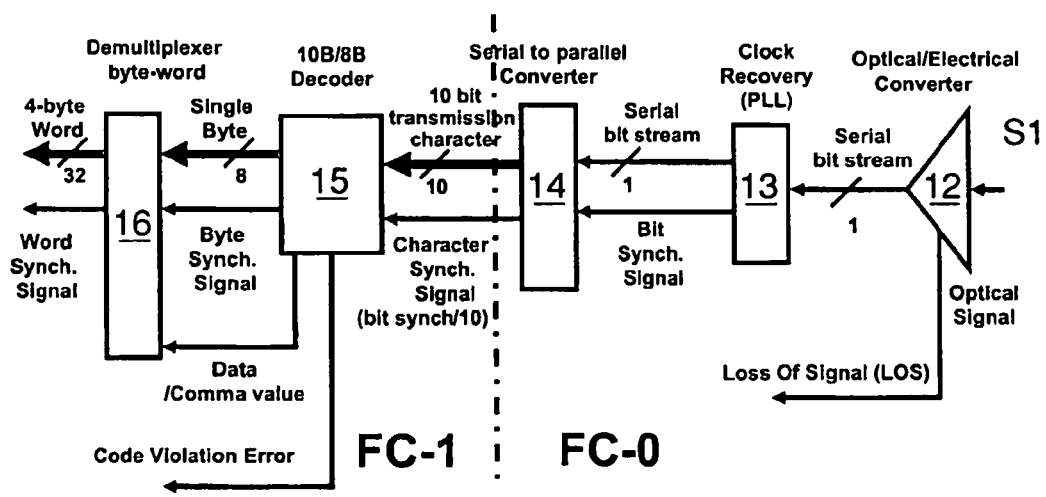
FIG. 2, is a block diagram of a receiver of an FC port.

The input block 11 performs a number of functions typical of an FC receiver at layers FC-0 and FC-1 of the FC stack and is similar to the receiver discussed with reference to FIG. 2, but for the fact that the 10-bit transmission character output by converter 14 is directly applied to demultiplexer 16 and a running disparity signal is extracted.

More precisely, the output signal S2 from the input block 11 comprises:

a 40 bit parallel data stream, composed by the received transmission word not yet decoded;

a word synchronisation signal;

a code violation error signal indicating an error code violation, if the decoding has not been successful;

a (positive or negative) signal representing the running disparity value expected by the receiver at a given moment.

As already discussed, a possible implementation of the input block 11 comprises an optical-electric converter 12 receiving an optical input signal and issuing a corresponding electric signal which is applied to a PLL device 13 for recovering the bit timing whereby the output signal from the PLL device comprises a bit serial stream and a clock signal. Both the serial stream data and the clock signal are input to a serial/parallel converter 14 that converts the input bit stream into a 10 bit parallel stream together with a character sync signal (at a rate that is one tenth of that of the bit sync signal).

The input block 11 further comprises a decoder 15 which accomplishes the following functions:

the locking of the byte and word synchronisation through the detection of the "comma" character, the decoding of the 10B control and data characters, the consistency check of the expected running disparity, by comparison with the running disparity calculated from the received stream data.

In addition, the decoder 15 supplies the above mentioned running disparity and code violation signals.

The input block 11 further comprises a demultiplexer 16 to the inputs of which the 10 bit parallel data stream from the serial-parallel converter 14 and the character synchronisation signal from the decoder are applied. The demultiplexer outputs a 40 bit parallel data stream including a transmission word, and a word synchronisation.

The 40 bit parallel data stream is applied to a buffering block 20 which inserts the transmission word in transit into a 40 bit buffer 21 and checks whether it is an ordered set of the SOF, EOF type or an invalid transmission word and outputs an indication thereof. The buffering block 20 further emits a parallel data stream composed by the buffered transmission word (TW). A possible implementation of such block is disclosed in 1998 U.S. Pat. No.5,784,387.

The generator 31 of ordered set of the IDLE type can be realised, for instance, with a buffer containing the ordered set of the IDLE type.

The generator 32 of ordered set of the EOF type produces two different types of EOF frames: a first type the first character of which begins with a positive running disparity, and a second type the first character of which begins with a negative running disparity.

The multiplexer 40 selects one input among those received from the buffering block 20, from the generator 31 (IDLE) and from generator 32 (EOF), and forwards it to the output buffer 45.

The content of the output buffer 45 together with the word synchronism signal is applied to the input of the output block 50. The output of this latter supplies the optical signal for the FC receiver.

In the illustrated embodiment, the output block 50 comprises:
- a multiplexer 51 converting the input 40 bit parallel stream into a 10 bit parallel stream (the transmissions character) and the word synchronism signal into a character synchronism signal;
- a parallel-serial converter 52 that receives these two signals from the multiplexer 51 and produces at its outputs the serial data stream and the bit synchronism signal; and
- an electrical-optical converter 53 to which both the above signals are applied that in turn produce the optical signal for the FC client receiver.

The control unit 25 receives as inputs the running disparity and code violation signals from the decoder 15, the word synchronisation from the demultiplexer 16 and the output signals from the buffer 20, and controls the selection among the multiplexer input signals.

Figure 5:
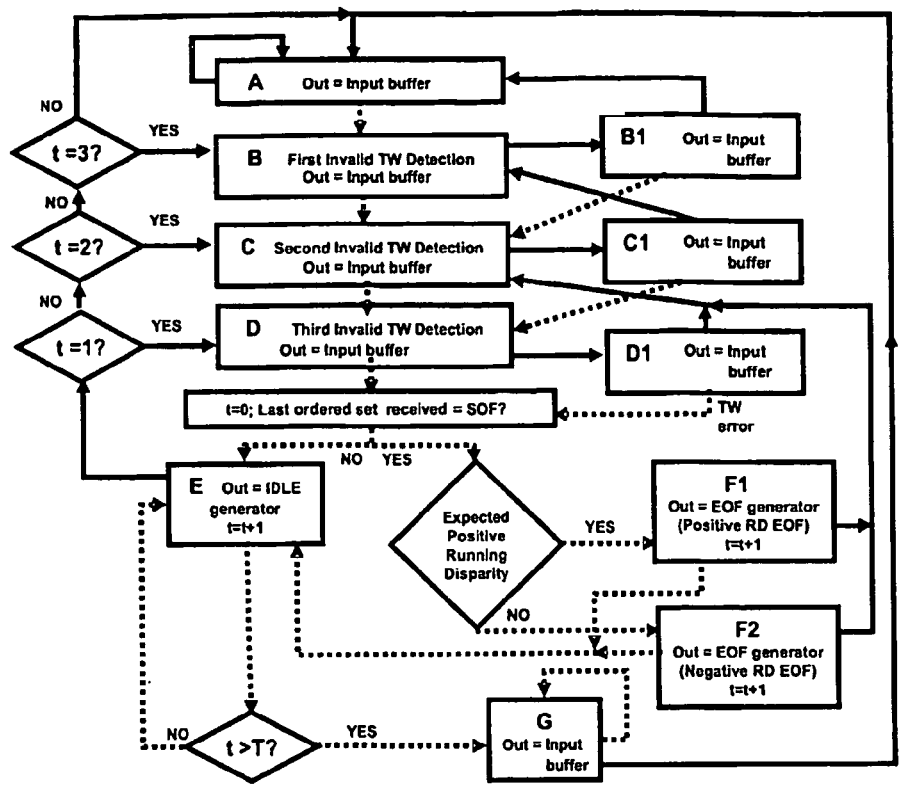
FIG. 5 is a flow chart illustrating the embodiment of FIG. 4.

The control unit 25 is a sort of state machine evolving in accordance with the flow chart of FIG. 5, the purpose of which machine is to select the proper signal to be transmitted to the FC client receiver. On the basis of the characteristics of the incoming traffic to input block 11, the control unit 25 checks for the occurrence of a succession of error events that could bring an FC receiver into a Loss of Synchronisation state.

The operation of the control unit 25 will now be illustrated with reference to the flow chart of FIG. 5. The events that drive the state machine from one state to another are the receipts of valid or invalid TW. In FIG. 5, transitions following the receipt of a valid TW are represented by solid lines, while transitions following the receipt of an uncorrect TW are represented by dashed lines.

In presence of an FC traffic without errors the control unit 25 is in the state A. in is which the input of the multiplexer 40 is connected to the output of the buffer 21. Upon receiving a first invalid TW, the machine goes to the state B. If the next TW is a valid (correct) TW, state B1 is reached, otherwise the machine goes to state C (second invalid word detection).

When in state B1, the receiving of another invalid TW leads the machine to the state C, otherwise (an invalid TW followed by two valid TWs) the machine returns to the state A.

When in the state C, the receiving of another erroneous TW, drives the machine into state D (third invalid detection), otherwise it goes to state C1. From this state (i.e. C1), the system returns to B if the next TW is correct, otherwise it goes to state D.

From state D, if the next received TW is correct, the system goes to state D1, and therefrom, if also the next TW is correct, into state C.

It is to point out that when the system is in state D or D1 and an invalid TW is received, the transfer of such a invalid TW to the FC receiver would drive this latter from a Synchronisation Acquired state to a state of Loss Of Synchronisation.

Therefore under these conditions, according to the invention, such invalid TW is not transferred to the output buffer 45. The control unit 25 checks whether the last received ordered set was a SOF, meaning that the FC stream relates to a data frame (case a.), or a sequence of ordered set of the IDLE or control type (case b.). In the first (a.) case, the control unit 25 switches the multiplexer input to the positive output of EOF generator 32 if the RD is positive (state F1), or to the negative output of EOF generator 32 if the RD is negative (state F2). At the same time the counter of the number of TWs that are locally generated and sent to the output buffer is updated. The value of such counter is represented by t in the flow chart of FIG. 5.

On the other hand, if the last received ordered set does not coincide with SOF, or if the system is in the states F1 or F2 and an invalid TW is received, the control unit 25 switches the multiplexer input to the IDLE generator 31 (state E), and the output buffer 45 receives ordered sets that are locally generated, and this goes on until t has become equal to a configurable amount T, that is until the time elapsed from when the first locally generated frame exceeds a predetermined (and configurable) value.

The above time or equivalently the maximum number of locally generated frames T are chosen so as to grant to the protection mechanism in the receiver of the WDM or SDH/SONET network a time sufficient for recovering the network connection continuity—when the invalid received TWs were caused by the intervention of the protection mechanism in the receiver—whereby a meaningful FC traffic (without errors) can be resumed through the network.

In case the invalid received TWs are due to other reasons, such as a different type of malfunction, and in the E state another invalid TW is being received after the above time has elapsed, a state G is reached and the multiplexer input is switched to the information stream from buffer 20. In this way the apparatus of the invention forwards again the incoming FC traffic towards the FC receiver. The G state differs from the A state in that the receiving of a stream of invalid TWs in the G state does not lead to a state change. On the other hand, upon receiving a correct TW in the G state it is assumed that the incoming FC traffic is again meaningful, and the control unit returns to state A.

In view of the correspondence created between the states A, B, B1, C, C1, D and D1 and the corresponding sub-states of the FC receiver, if the control unit is in one of the states E, F1 or F2, upon receiving a correct frame the control unit has to estimate in which of the sub-states the FC receiver is, and enters the states A, B, C or D in accordance with the number of correct frames transferred to the FC receiver, as indicated by the counter t. More particularly, if the state F1, respectively F2, has been reached from the state D, respectively D1, the control unit reaches the state C, respectively C1.

In all cases, the control unit 25 switches again the multiplexer input to the output of the input block 11 whereby the correct frame is routed to the FC receiver.

In a computer program a code segment for implementing the functions of the control unit 25 will comprise a corresponding flag which is updated to the states A, B, B1, C, C1, D, D1, E, F1, F2 and G, said flag being indicative of the error condition.

With reference to the couples of time diagrams 1-5 of FIG. 6, a few possible operating conditions of the device in accordance with the invention will be discussed.

In the diagram couple, the first sequence IN relates to the input frames sequence, whereas the second sequence OUT shows the output frame sequence provided by the apparatus to the FC receiver.

Figure 6:
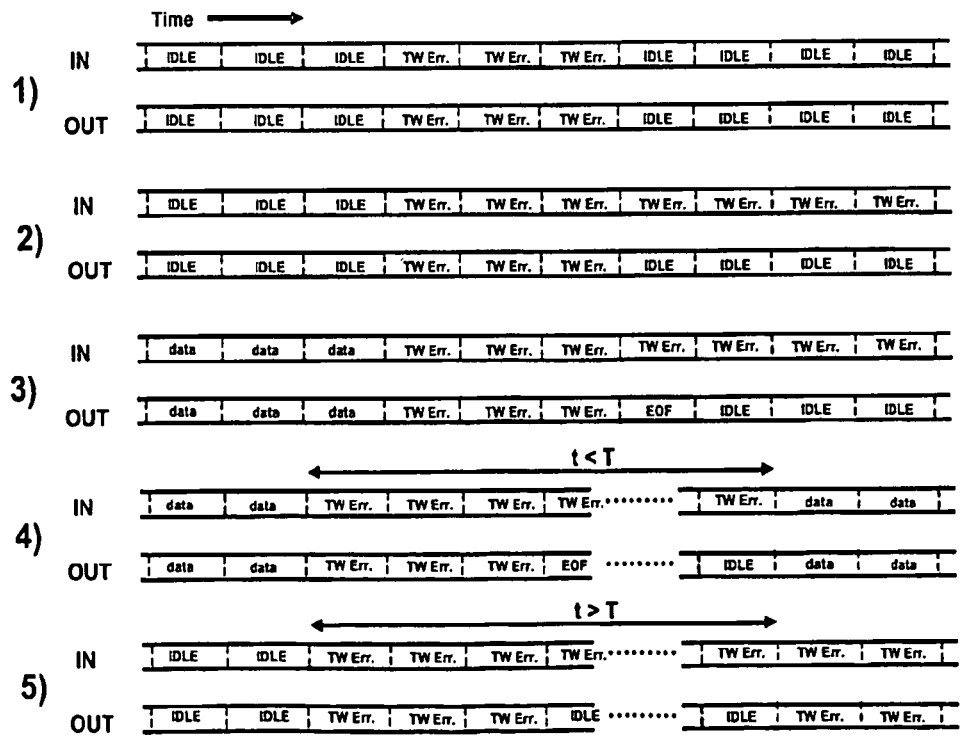
FIG. 6 comprises time diagrams illustrating the operation of an apparatus according to the invention.

Diagram 1) of FIG. 6 illustrates the behaviour of the apparatus of the invention reacting to a sequence of three consecutive TWs carrying errors, followed by IDLE frames without errors. Since such frame sequence does not drive the FC receiver into a Loss Of Synchronisation state, the described Decoupling Device DD according to the invention allows the passage of the frames to the FC receiver (the apparatus behaves as a transparent device).

In diagram 2) of FIG. 6 the IN portion refers to a frame sequence carrying errors that would lead the FC receiver into a Loss Of Synchronisation state since the sequence contains more than four consecutive TWs with errors. In such case the Decoupling Device, starting from the fourth TW with errors, replaces the incoming data stream with a succession of frames of the IDLE type. In this way, the FC receiver receives only three consecutive TWs with errors and is prevented from transition into the Loss of Synchronisation state.

Diagram 3) of FIG. 6 illustrates a situation similar to that of diagram 2) but for the kind of the incoming traffic which in this case is made up by TWs of data frames. The Decoupling Device allows the passage of the first three TWs with errors but replaces the fourth one with an EOF frame to properly terminate the data frame transmitted to the FC receiver, and replaces all the subsequent error-containing TWs with IDLE frames. Like in the case of diagram 2), the FC receiver is prevented from transition into the Loss of Synchronisation state. Diagrams 4) and 5) of FIG. 6 illustrate situations in which, during the transmission of a data frame, a time interval of duration t occurs during which the Decoupling Device receives from the transport network a sequence of frames with errors. Such a situation can be due, for example, to the intervention of a protection mechanism in the transport network.

In diagram 4) of FIG. 6 such time interval is shorter than a (configurable) limit T, selected so as to allow the completion of the commutation path in the transport network requested by the protection. Therefore, upon the re-establishment of the link continuity of the connection, valid TWs are received within such time T and the Decoupling Device stops the generation of IDLE frames and resumes to pass the incoming frames to the FC receiver.

Figure 7:
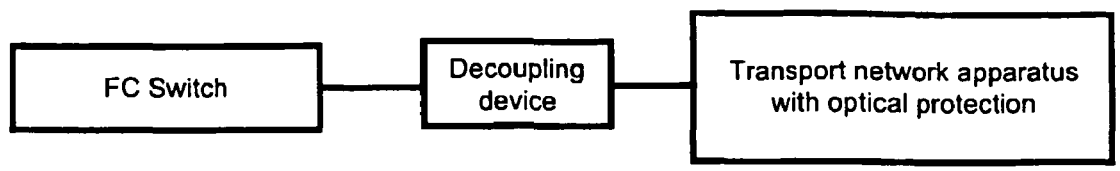
FIG. 7 illustrates an embodiment of the invention as a stand-alone apparatus in the signal connecting path of an FC network.

On the contrary, in diagram 5) of FIG. 6 the time interval in which no valid frames are received is longer than T, a situation which can occur because of malfunctions or failures in the transport network for which neither the protection mechanism nor the redundancy in the transmission apparatuses have been designed to intervene. After a T interval has elapsed, the Decoupling Device resumes to transparently forward the incoming frames with errors to the FC receiver, leaving the management of the error events to the terminal FC clients. FIG. 7 shows the Decoupling Device realised as a stand-alone apparatus arranged between an FC switch and the transport network apparatus with optical protection.

The functions necessary to implement the method of the invention can be directly integrated in an apparatus of the transport network. In view of the type of the network device (ADM SDH, OADM) and of the optical protection implemented, there are possible different architectures, all falling in the general scheme shown in FIG. 8.

Figure 8:
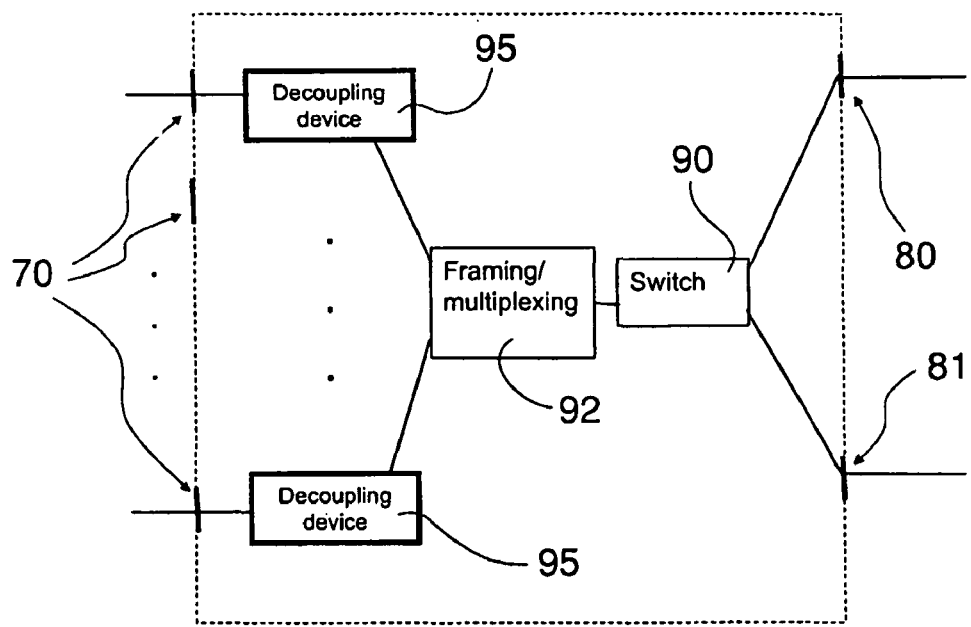
FIG. 8 illustrates an embodiment of the invention providing for an integration in the apparatus of the transport network.

The apparatus shown in FIG. 8 can be defined as a terminal of an apparatus of the transport network mapping the FC signals into line signals (WDM, SDH, etc.), in case gathering several client signals (all of which, or part of which, are FCs) into a single line signal, capable of selecting between two line signals the one to be transmitted to the client apparatus (protection 1+1).

The complete network apparatus will include a plurality of terminal apparatuses of the type shown in FIG. 8 and a section for multiplexing the output line signals of the terminals. In the following the expression "network apparatus" is to be meant as "network terminal apparatus" since in this context the single terminal apparatus needs to be considered.

FIG. 8 shows the following functional blocks:
input/output interfaces 80, 81 on the line side; typically the signals outcoming from such interfaces are optical signals and WDM multiplexed with other signals of the same type;
input/output interfaces 70 on the client side, either electrical or (typically) optical; although the interfaces of interest for the invention are of the FC type, nevertheless the apparatus could also include interfaces for other client signals;
a switching section 90 accomplishing the selection between two line signals;
a framing section 92, which is necessary when the FC client is transported on a frame structure such as SDH or other proprietary frames;
a multiplexing/demultiplexing section (in the time domain) when the transport mechanism provides for collecting a plurality of signals into a single line signal; In the Figure such operation is accomplished in the same device 92 providing for the framing.

In accordance with this (integrating) embodiment of the invention, a Decoupling Device 95 is inserted in the line client signal path, downstream of the protection switch 90. Input and output interfaces are provided on the Decoupling Device through which interfaces FC signals pass.

When such interfaces are optical interfaces, as it occurs when the protection switch is realised as an optical component, a receiver and a transmitter are required in the device, for an optical-electrical conversion and an electrical-optical conversion, respectively. Particularly the receiver shall integrate CDR (Clock and Date recovery) functions.

When the protection switch is realised in the electrical domain, the Decoupling Device can use functions already present in the preceding blocks (framer, demux), such as the CDR function.

The Decoupling Device can require an independent hardware, or its functions can be realised together with the demultiplexing, using the same hardware (for instance FPGA).

In the following a few specific embodiments will be illustrated with reference to FIGS. 9 to 13.

Figure 9:
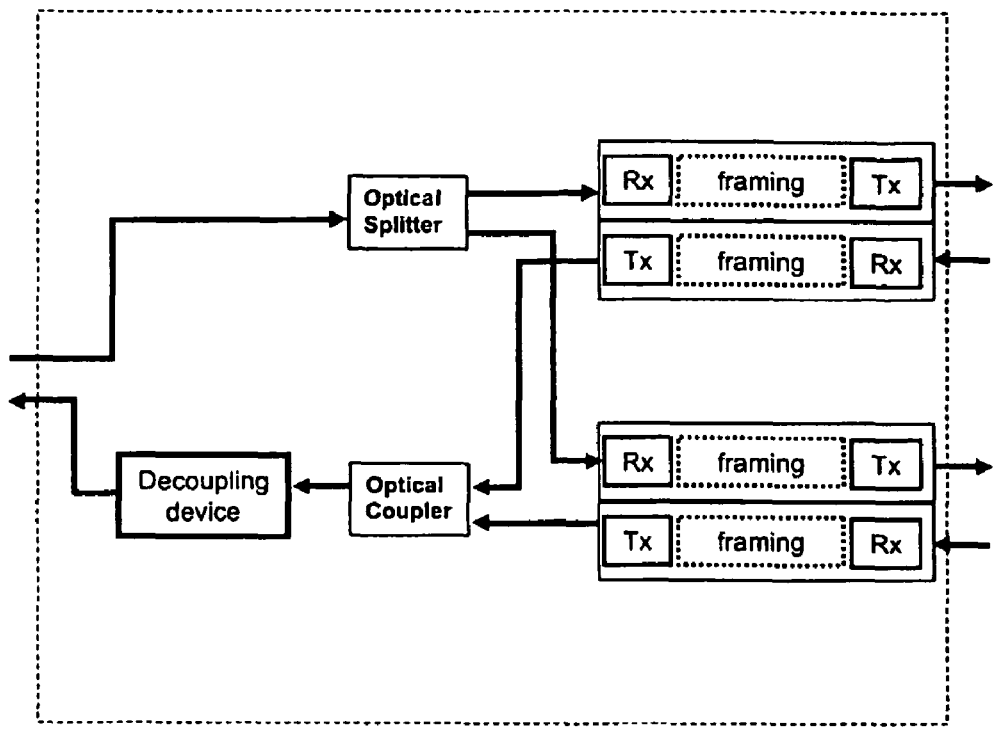
FIG. 9 illustrates an embodiment of the invention providing for an integration in an apparatus of the transport network offering line and card protection and implementing the protection switch at optical level.

FIG. 9 illustrates an embodiment of the invention providing for an integration in an apparatus of the transport network offering both line protection (two network path) and card protection (two line cards, one for each network path) and implementing the protection switch at optical level. In the transmission direction from line to client, there is a dedicated transponder card for each line signal at which transponder the client signal is extracted. More particularly:
in the case of a direct FC transport on WDM the extraction corresponds to a simple 3R (Reamplification Reshaping Retiming) regeneration of the signal coming from the line;
in the case of a single FC client transport on SDH, the operation implies the optical/electrical conversion of the line signal, the extraction of the FC client from the SDH frame, the conversion of the extracted client signal;
in the case of proprietary mapping of FC/SDH or FC on a structure of proprietary frame, the operation implies the optical/electrical conversion of the line signal, the extraction of the FC client from the used frame, the conversion of the extracted client signal.

On the client side, the outputs of the two transponders are combined in an optical coupler and the selection between the two signals is simply obtained by disabling one of the two transmitters on the client side of the transponders.

In the transmission direction from client to line, the client (optical) signal is duplicated by a splitter and each copy is sent to a transponder card that produces the line signal, which is the reverse operation of the extraction in receiving.

In this case the Decoupling Device is inserted downstream of the optical coupler and incorporates the Clock and Data Recovery functions as well as the E/O and O/E conversions.

Figure 10:
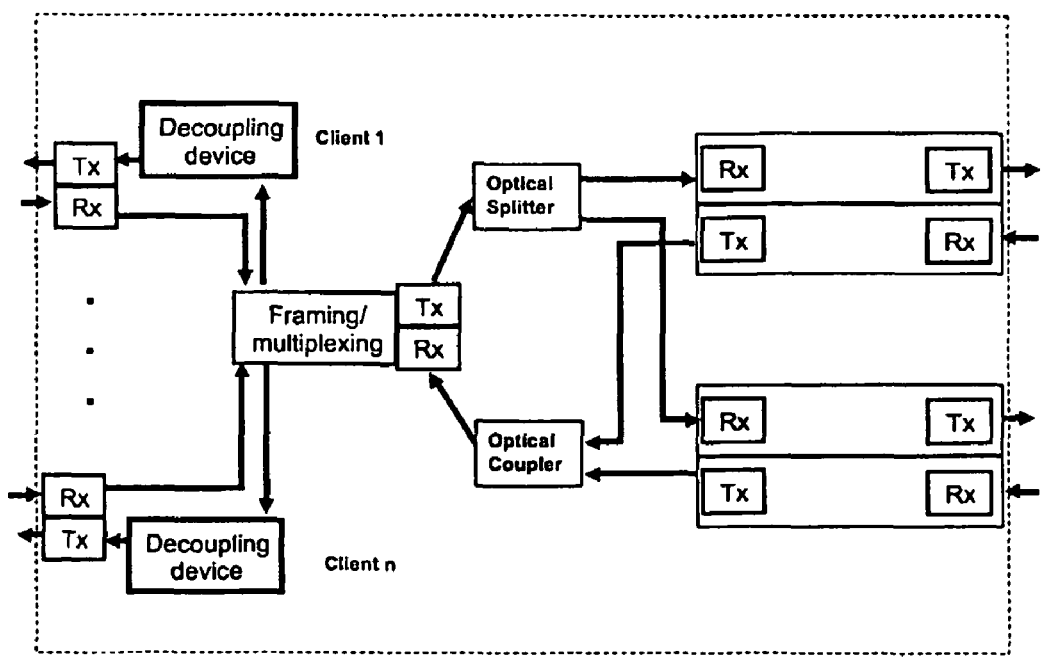
FIG. 10 illustrates an embodiment of the invention providing for an integration in an apparatus of the transport network that allows to multiplex two or more client signal in a single line signal.

In case of time multiplexing of two or more clients to a single line signal, the architecture of FIG. 10 is preferably used. Since the multiplexing and framing functions take necessarily place at the electric level, the insertion of the decoupling device requires, for example, the addition of a electronic component to be inserted between the demux and the transmitter on the client side. As already mentioned, the same hardware can be used (for instance a programmable logic) to realise both the framing/multiplexing and the functions of the invention.

Figure 11:
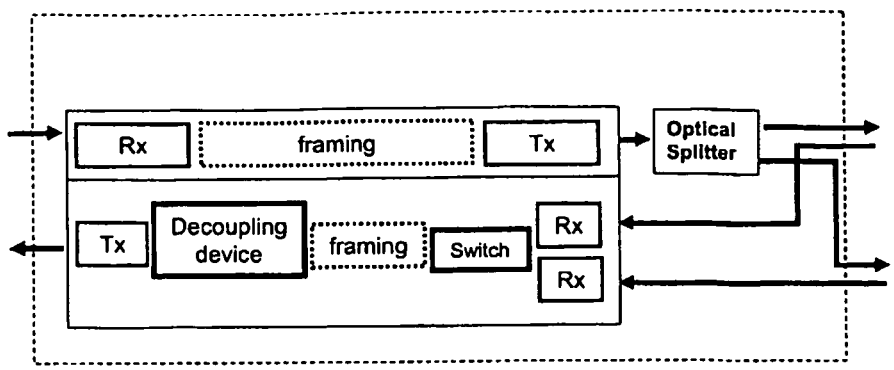
FIG. 11 illustrates an embodiment of the invention providing for an integration in an apparatus of the transport network offering line protection and implementing the protection switch at electrical level.

FIG. 11 illustrates an embodiment of the invention providing for an integration in an apparatus of the transport network offering line protection and implementing the protection switch at electrical level. The apparatus, having a single transponder, implements the protection on the line of transmission, but not on the line Tx/Rx card.

In the transmission direction from client to line, the signal duplication occurs downstream of the generation of the line signal.

In the transmission direction from line to client the signals on the two lines are received by two independent receivers. The selection of one of the two electric signals is accomplished through a switch, or by removing the feeding of one of the receivers (or of an amplification stage in one of the receivers). From the selected signal the FC client is extracted. The discussion with reference to the situation of FIG. 9 applies also to the extraction procedure. The Decoupling Device is inserted at this point and is therefore realised inside the transponder card, with dedicated or shared hardware.

In case there is present a function for aggregating a plurality of client signals, a plurality of decoupling devices (corresponding to the number of the FC clients) are to be inserted downstream of the framing/demux.

Figure 12:
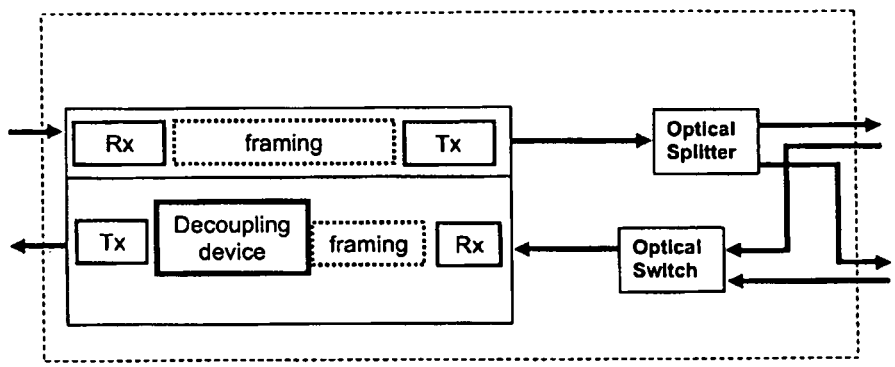
FIG. 12 illustrates an embodiment of the invention providing for an integration in an apparatus of the transport network offering line protection and implementing the protection switch at optical level.

FIG. 12 illustrates an embodiment of the invention providing for an integration in an apparatus of the transport network offering line protection and implementing the protection switch at optical level. Likewise to the preceding case the apparatus provides for a single transponder card, inside which the functions requested by the invention are integrated. The selection between the two line signals of line is carried out on the optical signals upwards of the transponder, through an optical switch that can be either a stand-alone device or an optical matrix to which a plurality of line signals are carried, and having both routing and protection switching functions.

Figure 13:
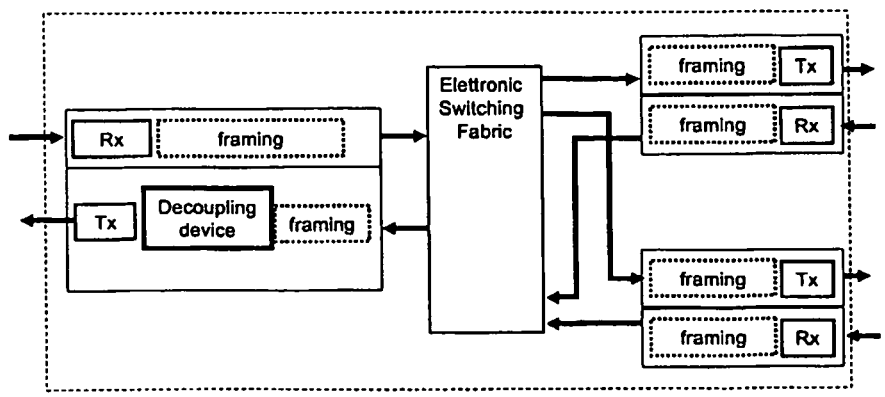
FIG. 13 illustrates an embodiment of the invention providing for an integration in an apparatus of the transport network offering line and card protection and implementing the protection switch at electrical level.

FIG. 13 illustrates an embodiment of the invention providing for an integration in an apparatus of the transport network offering line and card protection and implementing the protection switch at electrical level. Line transceiver cards on client side are used instead of transponder cards. Each line signal has, for example, a dedicated transceiver (card protection) in which the optical-electrical conversion is carried out when receiving. The selection between the two electrical signals coming out from the two cards is accomplished, for example, by an electrical switch that can be either analogical or digital, either a single device or an electrical matrix accomplishing both the routing and protection switch functions. As a principle, the framing functions are resident either in the client card or in the line card. The Decoupling Device is preferably integrated in the client card upwards of the transmitter.

The embodiment examples of FIG. 7 to 13 have been disclosed by taking as a reference a network architecture in which the client signal are FC signals.

It would be apparent that the same example may be applied to network architectures employing different protocols wherein a short link interruption, due for example to a protection switching, may cause a long traffic interruption due to network reconfiguration procedures.

Moreover, the embodiment examples have been disclosed by applying FC signals to transport networks of WDM or SDH/SONET type.

It would be apparent that other signals belonging to different protocols may be applied to the above transport networks.

Although the present invention has been illustrated with reference to actually preferred embodiments, it is generally subjected to other applications and modifications which fall within the scope of the invention, as it will be evident to the skilled of the art.

The invention claimed is:

1. A method for preventing a temporary traffic interruption between transmitting and receiving client ports in a communication network providing for transmission of a data stream along at least one path and wherein a link interruption is able to cause a reconfiguration procedure at the receiving client port, comprising the steps of:
    monitoring the data stream as received by the receiving client port and upon detecting in said data stream at least one predetermined error sequence;
    replacing said data stream as received with a filling data stream to prevent the receiving client port from detecting an error condition and from causing the reconfiguration procedure; and
    resuming forwarding of the data stream as received after a predetermined time interval,
    wherein said communication network comprises at least two paths and said error condition is due to switching from one of said at least two paths to the other of said at least two paths.

2. The method as claimed in claim 1, wherein said client ports are fibre channel ports transmitting and receiving signals compliant to fibre channel protocol.

3. The method as claimed in claim 2, wherein said at least one predetermined error sequence in the received data stream comprises a loss of the signals and sequences able to drive a fibre channel receiver into a loss of synchronisation state.

4. The method as claimed in claim 2, wherein running disparity and code violation are considered in detecting an error sequence in the received data stream.

5. The method as claimed in claim 2, comprising the steps of:
    detecting a word or a sequence of a number of characters in said data stream directed to said receiving client port; and
    updating a flag indicative of the error condition in said data stream to a predetermined state selected from A, B, B1, C, C1, D and D1 according to the following rules:
    in presence of traffic without errors the flag is set to state A;
    upon receiving a first invalid word the flag is set to state B;
    when the flag is in state B and the next detected word is valid, the flag is set to state B1;
    when the flag is in state B1 and the next detected word is valid, the flag is set to state A;
    when the flag is in state B or B1 and the next detected word is invalid, the flag is set to state C;
    when the flag is in state C and the next detected word is valid, the flag is set to state C1;
    when the flag is in state C1 and the next detected word is valid, the flag is set to state B;
    when the flag is in state C or C1 and the next detected word is invalid, the flag is set to state D;
    when the flag is in state D and the next detected word is valid, the flag is set to state D1;
    when the flag is in state D1 and the next detected word is valid, the flag is set to state C; and when the flag is in state D or D1 and the next detected word is invalid, said invalid word in said data stream is not transferred to said receiving client port and is replaced with said filling data stream to prevent the receiving client port from detecting the error condition.

6. The method as claimed in claim 5, comprising the steps of:
counting a number indicating a quantity of data words in said filling data stream; and
resuming the forwarding of the received data stream to said receiving client port after said number indicating the quantity of data words has reached a predetermined value.

7. The method as claimed in claim 6, wherein after said number indicating the quantity of data words has reached the predetermined value, said flag is set to state G and said flag is updated from state G to state A when the next valid word is received.

8. The method as claimed in claim 5, comprising the steps of generating said filling data stream as positive or negative EOF words, depending on whether running disparity of the last received word is positive or negative respectively, and of updating said flag indicative of the error condition to state F1 or F2 respectively, if the last received ordered set was an SOF frame.

9. The method as claimed in claim 8, comprising the steps of generating said filling data stream as IDLE words and of updating said flag indicative of the error condition to state E, if the last detected word is invalid and said flag is in state F1 or F2.

10. The method as claimed in claim 5, comprising the steps of generating said filling data stream as IDLE words and of updating said flag indicative of the error condition to state E, if the last received ordered set was a sequence of IDLE or control data type.

11. The method as claimed in claim 1, wherein said communication network is a wavelength division multiplexing transport network.

12. The method as claimed in claim 1, wherein said communication network is a synchronous digital hierarchy/synchronous optical network transport network.

13. The method as claimed in claim 1, wherein a predetermined time interval is selected so as to allow to recover network connection continuity.

14. An apparatus for use in a communication network wherein at least one path is provided between transmitting and receiving client ports for exchanging a data stream through the communication network and wherein a link interruption is able to cause a reconfiguration procedure at the receiving client port, the apparatus being capable of masking to the receiving client port the link interruption for a predetermined time interval, comprising:
a monitoring and detecting unit for receiving the data stream directed to said receiving client port and for detecting in said data stream at least one predetermined error sequence; and
a generator of filling data streams controlled by said monitoring and detecting unit for selectively sending, to said receiving client port and for a predetermined time interval, said filling data streams adapted to prevent the receiving client port from detecting an error condition and from causing the reconfiguration procedure,
wherein said communication network comprises at least two paths and said error condition is due to switching from one of said at least two paths to the other of said at least two paths.

15. The apparatus as claimed in claim 14, wherein said communication network transports signals compliant to fibre channel protocol.

16. The apparatus as claimed in claim 15, comprising:
an input block;
a buffer connected to an output of said input block;
a first generator of ordered set of an IDLE type;
a second generator of ordered set of an EOF type;
a multiplexer, inputs of which are connected to outputs of said buffer, and said first and second generators;
an output buffer, an input of which is connected to an output of said multiplexer, and the outputs of said output buffer are connected to an output block; and
a control unit connected to said input block and said buffer to selectively connect the output of said multiplexer with one of said inputs of said multiplexer.

17. The apparatus as claimed in claim 14, wherein said communication network is a wavelength division multiplexing transport network.

18. The apparatus as claimed in claim 14, wherein said communication network is a synchronous digital hierarchy/synchronous optical network transport network.

19. A storage area network comprising transmitting and receiving client ports connected through a transport network providing for transmission of a data stream along at least one path and wherein a link interruption is able to cause a reconfiguration procedure at the receiving client port, said storage area network comprising:
a monitoring apparatus for monitoring the data stream as received by said receiving client port and for replacing said data stream with a filling data stream for a predetermined time interval to prevent the receiving client port from detecting an error condition and from causing the reconfiguration procedure,
wherein said storage area network comprises at least two separate paths and said monitoring apparatus prevents the detection of the error condition in said receiving client port due to switching from one of said at least two paths to the other of said at least two paths.

20. The storage area network as claimed in claim 19, wherein said client ports are fibre channel ports transmitting and receiving signals compliant to fibre channel protocol.

21. The storage area network as claimed in claim 20, comprising:
an input block;
a buffer connected to an output of said input block;
a first generator of ordered set of an IDLE type;
a second generator of ordered set of an EOF type;
a multiplexer, inputs of which are connected to outputs of the buffer, and the first and second generators;
an output buffer, an input of which is connected to an output of said multiplexer, and outputs of said output buffer are connected to an output block; and
a control unit connected to said input block and said buffer to selectively connect the output of said multiplexer with one of inputs of said multiplexer.

22. The storage area network as claimed in claim 19, wherein said transport network is a wavelength division multiplexing network.

23. The storage area network as claimed in claim 19, wherein said transport network is a synchronous digital hierarchy/synchronous optical network transport network.

24. A nontransitory computer readable storage medium encoded with a computer program product loadable in a memory of at least one computer for implementing a method for preventing a temporary traffic interruption between transmitting and receiving client ports in a communication network providing for transmission of a data stream along at least one path and wherein a link interruption is able to cause a reconfiguration procedure at the receiving client port, the computer program product comprising:

a code segment for monitoring the data stream as received by the receiving client port and for detecting in said data stream as received an error sequence causing an error condition;

a code segment for replacing said data stream causing the error condition with a filling data stream to prevent the receiving client port from detecting the error condition and from causing the reconfiguration procedure; and a code segment for resuming forwarding of the data stream as received after a predetermined time interval has elapsed, wherein said communication network comprises at least two separate paths and said error condition is due to switching from one of said at least two paths to the other of said at least two paths.

25. The nontransitory computer readable storage medium as claimed in claim 24, wherein said client ports are fibre channel ports transmitting and receiving signals compliant to fibre channel protocol.

26. The nontransitory computer readable storage medium as claimed in claim 25, wherein said error sequence in the received data stream comprises a loss of the signals and sequences able to drive a fibre channel receiver into a loss of synchronisation state.

27. The nontransitory computer readable storage medium as claimed in claim 25, wherein running disparity and code violation are considered in detecting the error sequence in the received data stream.

28. The nontransitory computer readable storage medium as claimed in claim 25, comprising a code segment that upon detecting a word or a sequence of a number of characters in said data stream directed to said receiving client port sets a flag indicative of the error condition to a predetermined state selected from A, B, B1, C, C1, D and D1 according to the following rules:

in presence of traffic without errors the flag is set to state A;
upon receiving a first invalid word the flag is set to state B;
when the flag is in state B and the next detected word is valid, the flag is set to state B1;
when the flag is in state B1 and the next detected word is valid, the flag is set to state A;
when the flag is in state B or B1 and the next detected word is invalid, the flag is set to state C;
when the flag is in state C and the next detected word is valid, the flag is set to state C1;
when the flag is in state C1 and the next detected word is valid, the flag is set to state B;
when the flag is in state C or C1 and the next detected word is invalid, the flag is set to state D;
when the flag is in state D and the next detected word is valid, the flag is set to state D1;
when the flag is in state D1 and the next detected word is valid, the flag is set to state C; and
when the flag is in state D or D1 and the next detected word is invalid, said invalid word in said data stream is not transferred to said receiving client port and is replaced with said filling data stream to prevent the receiving client port from detecting the error condition.

29. The nontransitory computer readable storage medium as claimed in claim 28, comprising a code segment for counting a number indicating a quantity of data words in said filling data stream that is locally generated and for resuming the forwarding of the received data stream after said number indicating the quantity of data words has reached a predetermined value.

30. The nontransitory computer readable storage medium as claimed in claim 29, wherein after said number indicating the quantity of data words has reached the predetermined value, said flag is set to state G, and said flag is updated from state G to state A when the next valid word is received.

31. The nontransitory computer readable storage medium as claimed in claim 28, comprising a code segment for generating said filling data stream as positive or negative EOF words, depending on whether running disparity of the last received word is positive or negative respectively, and setting said flag indicative of the error condition to state F1 or F2 respectively, if the last received ordered set was a SOF.

32. The nontransitory computer readable storage medium as claimed in claim 31, comprising a code segment for generating said filling data stream as IDLE words if the last detected word is invalid and said flag is in state F1 or F2.

33. The nontransitory computer readable storage medium as claimed in claim 28, comprising a code segment for generating said filling data stream as IDLE words and setting said flag indicative of the error condition to state E, if the last received ordered set was a sequence of IDLE or control data type.

34. The nontransitory computer readable storage medium as claimed in claim 24, wherein said communication network is a wavelength division multiplexing transport network.

35. The nontransitory computer readable storage medium as claimed in claim 24, wherein said communication network is a synchronous digital hierarchy/synchronous optical network transport network.

36. The nontransitory computer readable storage medium as claimed in claim 24, wherein a predetermined time interval is selected so as to allow to recover a network connection continuity.

* * * * *